US 6,575,473 B2

(12) United States Patent
Sugimoto et al.

(10) Patent No.: US 6,575,473 B2
(45) Date of Patent: Jun. 10, 2003

(54) METALLIC GASKET (75) Inventors: Kiyoshi Sugimoto, Osaka (JP);
Tsuyoshi Hiramatsu, Osaka (JP);
Kazuya Yoshijima, Aichi-ken (JP)

(73) Assignee: Nippon Gasket Co., Ltd., Osaka (JP)

( * ) Notice: Subject to any disclaimer, the term of this patent is extended or adjusted under 35 U.S.C. 154(b) by 0 days.

(21) Appl. No.: 09/941,856

(22) Filed: Aug. 30, 2001

(65) Prior Publication Data
US 2002/0027327 A1 Mar. 7, 2002

(30) Foreign Application Priority Data
Sep. 4, 2000 (JP) ..................... 2000-267540

(51) Int. Cl.$^7$ ............................... F02F 11/00
(52) U.S. Cl. .................. 277/592; 277/594; 277/595; 277/598
(58) Field of Search .................. 277/591–594, 277/596, 598

(56) References Cited

U.S. PATENT DOCUMENTS

| 5,544,901 A | * | 8/1996 | Kubouchi et al. | ........... | 277/591 |
| 6,056,296 A | * | 5/2000 | Li | ............... | 277/592 |
| 6,182,976 B1 | * | 2/2001 | Maekawa et al. | ........... | 277/593 |
| 6,299,175 B1 | * | 10/2001 | Maekawa et al. | ........... | 277/593 |
| 6,328,314 B1 | * | 12/2001 | Jinno et al. | .................. | 277/593 |
| 6,336,639 B1 | * | 1/2002 | Ishida et al. | ................. | 277/594 |
| 6,349,945 B1 | * | 2/2002 | Schmucker et al. | ......... | 277/592 |
| 6,357,758 B1 | * | 3/2002 | Zurfluh | ........................ | 148/661 |
| 6,371,489 B1 | * | 4/2002 | Combet et al. | ............. | 277/594 |

FOREIGN PATENT DOCUMENTS

| JP | 1991/20626 | 3/1991 |
| JP | 1993/30628 | 8/1993 |
| JP | 1995/119836 | 3/1995 |
| JP | 1996/200503 | 8/1996 |
| JP | 1996/200506 | 8/1996 |

* cited by examiner

Primary Examiner—J. J. Swann
Assistant Examiner—André L. Jackson
(74) Attorney, Agent, or Firm—Browdy and Neimark, P.L.L.C.

(57) ABSTRACT

In a metallic gasket having a metallic sheet made with a recess surrounding around a diverse type of hole, in which an elastic sealing member is installed, a relation between the recess and the elastic sealing member in their cross sections and also configurations is so specified as to use the elastic sealing member within a range of elastic limit inherent in the elastic sealing member, thereby improving the sealing performance of the metallic gasket. The elastic sealing member is smaller than the recess in their cross section perpendicular to the major side of the metallic sheet. Thus, the elastic sealing member, when the metallic gasket is squeezed, may serve its useful function within the range of inherent elastic limit.

14 Claims, 5 Drawing Sheets

METALLIC GASKET

BACKGROUND OF THE INVENTION

1. Field of the Invention

The present invention relates to a metallic gasket such as cylinder-head gaskets and so on made therein with holes such as combustion holes, water holes, oil holes and so on and, more particularly, to a metallic gasket having a metallic sheet in which a recess formed around the hole is charged with an elastic sealing member to ensure sealing a joint between confronting members around the hole.

2. Description of the Prior Art

Conventionally, joints in high-pressure lines have been tightly connected with each other through gaskets interposed between flanges that are formed at pipe ends to be connected, one to each end. Among the gaskets ever used is an O-ring accommodated in recesses made in the mating surfaces of the flanges. Most O-rings have ever been considered and standardized as to design conditions such as the configuration of an O-ring itself, the configuration of a recess, the clearance into which the O-ring extends above the recess, and so on. With the metallic cylinder-head gaskets for engines, moreover, there has been used metallic plates that are provided on surfaces thereof with grooves in which elastic sealant of rubber, resinous material and so on is applied by, for example printing to seal around the holes made in the metallic plates for allowing coolant and the like to flow through there.

Recent trends in the automotive engine development are towards a lowering of the force needed to tighten head bolts, high-pressure combustion in engines, much wider use of aluminum alloys for major engine components, adoption of monolayer gaskets or reduction in number of metallic sheets to be overlaid to form the gasket, and so on. Nevertheless, the optimal design conditions for the cylinder-head gaskets to cope with the trends stated earlier do not yet come to light. Unlike the industrial fields where the O-ring has been ever used, most cylinder-head gaskets in the engine normally experience minor amounts of shrinkage and/or expansion during engine operation at not only areas limited around the water holes but also at other areas neighboring the head bolts tightened.

With the metallic gaskets, the elastic sealing member of rubber, resinous material and so on having the cross section in excess is preferable for ensuring a high statistic sealing stress when being squeezed. However, the excessive elastic sealant causes an occurrence of local bulge of the sealant between the mating surfaces to leave any clearance between the mating surfaces to be jointed tightly and further an occurrence of any strain and flowage of the sealant thereby hindering the elastic sealing member itself from following properly the shrinkage and/or expansion that might happen in the clearance between the mating surfaces of the cylinder head and the cylinder block, so that there is always a certain possibility that a fluid will leak through. Moreover, the elastic sealing member is apt to be much subject to premature degradation and any collapse due to stress loaded repeatedly. In contrast, the elastic sealing member sparse in cross section will have a strong possibility of failing in sealing effect. That is to say, the prior art has uncovered no critical condition to use the elastic sealing member of rubber, resinous material and so on within its elastic characteristic region.

Among prior sealing means around the bolt hole in the metallic gaskets is a monolayer metallic gasket in which there is provided a metallic sheet made with a folded flange around the bolt hole to allow tightening the gasket to the specified torque (refer to for example Japanese Patent Laid-Open No. 200506/1996, and Japanese Patent Application No. 2000-92021, a co-pending senior application of the present applicant). In the metallic gaskets recited just above, either the folded portion or the half bead chiefly provides the sealing construction around the bolt hole.

For example in another co-pending senior Japanese Patent Application No. 2000-83442, there has been also proposed an aluminum gasket provided with identical sealing constructions around the head-bolt holes. Even with the gasket recited earlier, however, there has not been followed any relation of the recess on the metallic sheet with the elastic sealant received in the recess.

Disclosed in, for example Japanese Utility Model Laid-Open No. 30628/1993 is another cylinder-head gasket in which a base sheet of the gasket is made on opposite sides thereof with grooves, one to each side, where printed sealing members are adhered to be raised above their associated sides. When the gasket is squeezed between the mating surfaces of the cylinder head and the cylinder block by tightening head bolts, the printed sealing members are allowed to make deformation to be embedded securely in the grooves on the opposite sides of the base sheet, thereby improving the sealing effect.

Japanese Patent Laid-Open No. 200503/1996 discloses a cylinder-head gasket in which a strip of sealant is equal in width to a groove in the metallic sheet so as to cover the overall bottom surface of the groove recessed below the associated side of the metallic sheet.

Moreover, the cylinder-head gaskets have been ever disclosed, in which the printed sealant is adhered in the groove to extend above the associated side of the base sheet. Nevertheless, such gaskets include only a recitation of any condition to raise the sealant above the side of the metallic sheet and, therefore they do not succeed to utilize well the elastic characteristics of the sealant itself for realizing the sealing means of high sealing reliability.

On the other hand, any multi-layered gasket especially for the engine construction with chain case is needed to provide seals simple in construction, with even high reliability. To cope with this, a three-layered gasket has been proposed as disclosed in, for example Japanese Patent Publication No. 20626/1991 and Japanese Patent Laid-Open No. 119836/1995. The three-layered gasket recited above has still a major problem of how to strengthen the seal on the lower metallic sheet at the chain case.

With the metallic gasket adapted for the cylinder-head gasket that is made therein with various holes such as combustion holes, water holes, oil holes, and bolt holes in which head bolts fit to joint together the cylinder head the cylinder block, it may be worthwhile providing an improved metallic gasket in which an elastic sealing member of rubber, resinous material and so on is placed in a recess or groove formed around the holes to ensure sealing effect around the holes, and in particular the elastic sealing member is kept in a specified relation with the recess or groove in their cross-sectioned configurations so as to utilize an elastic characteristic region inherent in the elastic sealing member itself for realizing the improvement in the sealing effect.

SUMMARY OF THE INVENTION

In a metallic gasket adaptable to a cylinder-head gasket interposed between the cylinder head and the cylinder block, a tri-face seal gasket interposed between the cylinder head and the cylinder block with chain case, and so on, a primary object of the present invention is to provide a metallic gasket of either monolayer type or multi-layered type, in which an elastic sealing member is placed in a recess formed around a combustion hole in a metallic sheet, and the elastic sealing member is kept in a specified relation with the recess or groove in their cross-sectioned configurations so as to use the elastic sealing member within an elastic characteristic region inherent in the elastic sealing member itself for realizing the improvement in the sealing effect, with even more inexpensive.

The present invention is concerned with a metallic gasket adapted to be disposed between mating surfaces of engine components, which is composed of a metallic sheet made with a hole and a recess surrounding around the hole, and an elastic sealing member installed in the recess, the improvement characterized in that the recess is defined by a bottom surface and side surfaces merging the bottom surface with any one major side of the metallic sheet; the elastic sealing member, when free of tightening force, is constructed with a bottom covering entirely the bottom surface of the recess and partially the side surfaces of the recess, a top extending above the major side of the metallic sheet, and slopes extending between the top and the bottom; the elastic sealing member is made not more than the recess in a cross section perpendicular to the major side of the metallic sheet; and the elastic sealing member, when tightened, experiences an elastic deformation, a maximum amount of which is limited within an area of the recess.

With the metallic gasket constructed as stated earlier, when it is squeezed between, for example the mating surfaces of the cylinder head and the cylinder block, the elastic sealing member may be used within the range of elastic limit inherent in the elastic sealing member of rubbers, resins and so on. That is to say, a top part of the elastic sealing member extending above any major side of the metallic sheet functions as the corrugated bead, while another part contained in the recess below the major side of the metallic sheet serves as a base to bear the top part. Thus, the deformation occurring in the elastic sealing member, as confined to only the elastic deformation in the area of the recess, does not result in the breakage of the elastic sealing member.

According to one aspect of the present invention, there is provided a metallic gasket in which the hole is at least any one of a combustion hole, a bolt hole in which a tightening bolt is allowed to fit, a water hole for passing cooling water through there, an oil hole allowing engine oil to flow through there, and an opening for a chain chamber in which an endless chain runs.

According to another aspect of the present invention, there is provided a metallic gasket in which the metallic sheet is made of any one of a single metallic plate and a lamination of more than one metallic sheet. When a single metallic sheet is selected, the recess is made on either any one major side or opposite sides of the metallic sheet. In contrast, when a lamination of more than one metallic sheet is adopted, the recess is formed on either any one or both of the outside major sides of the outermost metallic sheets.

According to a further another aspect of the present invention, there is provided a metallic gasket in which the bottom of the elastic sealing member has a height of at most about two-thirds a depth of the recess. In order to ensure the elastic deformation of the elastic sealing member under the squeezed condition with the elastic sealing member being confined within the recess in their cross section, it is preferable that the height where the widthwise far hems of the elastic sealing member reach the side surfaces of the recess is kept at most about two-thirds a depth of the recess.

According to another aspect of the present invention, there is provided a metallic gasket in which a peak of the top of the elastic sealing member is set at a height of a range of from 0.1 to 1.0 mm, preferably a range of from 0.1 to 0.5 mm, above the major side of the metallic sheet. In order to ensure the elastic deformation of the elastic sealing member under the squeezed condition with the elastic sealing member being confined within the recess in their cross section, the height up to the peak above the major side of the metallic sheet, or the height subject to the deformation should be limited to the specified range recited just above.

According to another aspect of the present invention, there is provided a metallic gasket in which the elastic sealing member is made less in cross section than the recess by about from 20 to 25%. This helps ensure the elastic deformation of the elastic sealing member under the squeezed condition with the elastic sealing member being confined within the recess in their cross section. Moreover, the elastic sealing member is made throughout a length thereof less in cross section and also in volume than the recess.

According to another aspect of the present invention, there is provided a metallic gasket in which the side surfaces defining the recess arranged in a manner either flaring out upwards from the bottom surface surface of the recess to the major side of the metallic sheet or extending upright from the bottom surface of the recess to the major side of the metallic sheet.

According to another aspect of the present invention, there is provided a metallic gasket in which the recess is formed on each of opposite major sides of the metallic sheet and the recesses on the opposite major sides are arranged in either aligned or off-set relation with each other across the metallic sheet.

According to a further another aspect of the present invention, there is provided a metallic gasket in which the elastic sealing member is made of at least any one selected from resins, rubbers and adhesive polymers. The elastic sealing member is made of any material that, when squeezed between the mating surfaces, may experience elastic deformation by compressive clamping force applied from the mating surfaces, thereby making tight seals between the mating surfaces.

According to another aspect of the present invention, there is provided a metallic gasket in which the elastic sealing member is adhered to the recess by using at least any one way of printing, adhesion, coating and ink-jetting. Adhesion of the elastic sealing material into the recess makes it possible to provide simply the elastic sealing member, with even steady and inexpensive.

According to another aspect of the present invention, there is provided a metallic gasket in which an area increased in thickness compared with the metallic sheet is provided at a zone between the recess and only the combustion hole of various holes. The thickened area is provided by at least any one of a bead formed on the metallic sheet, a folded construction formed by folding back a periphery of the combustion hole, a hollowed bulge containing therein a cavity, and a grommet fit over the periphery of the combustion hole. When the metallic gasket is squeezed, the sealing stress developed between the mating surfaces is allowed to increase at the thickened area and, therefore the compressive sealing stress rests on both the thickened area and the elastic sealing member.

With the metallic gasket constructed as stated earlier, the elastic sealing member may be free from an occurrence of flowage of the sealant even under either the squeezed condition or the operating condition that might cause any shrinkage and/or expansion in the clearance between the mating surfaces. Thus, the elastic sealing member may serve its useful function within the elastic characteristic range. This helps ensure the properly tight and enduring sealing condition, thereby keeping the gasket against premature degradation and any collapse. Accordingly, the present invention succeeds in the provision of the metallic gasket superior in sealing performance, with even simple and inexpensive.

Other aspects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

A metallic gasket according to the present invention will be in detail explained below with reference to the accompanying drawings showing preferred embodiments of the present invention.

Figure 1:
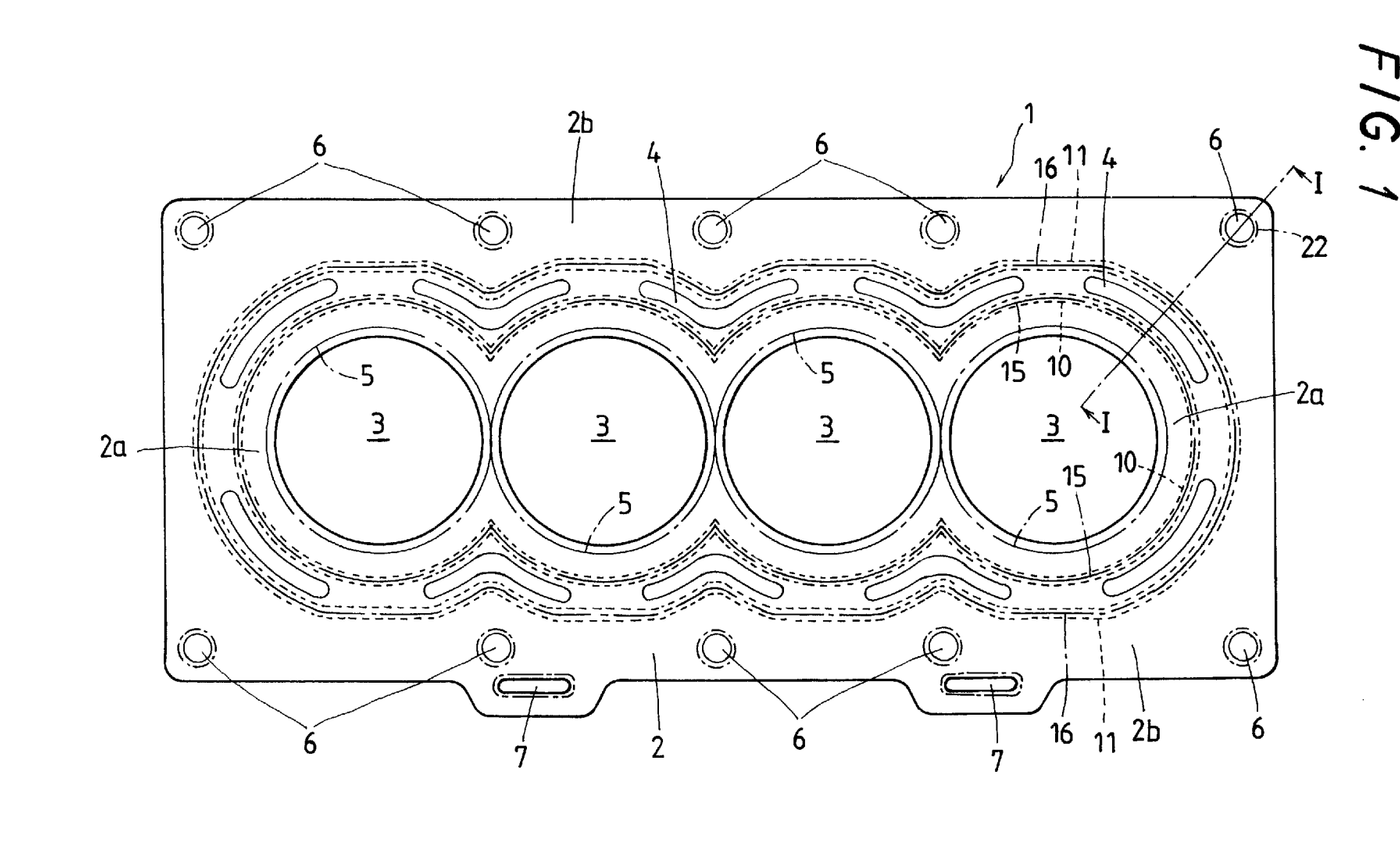
FIG. 1 is a top plan view of a metallic gasket in accordance with a preferred embodiment of the present invention of the type, which is adapted to a cylinder-head gasket.
Figure 2:
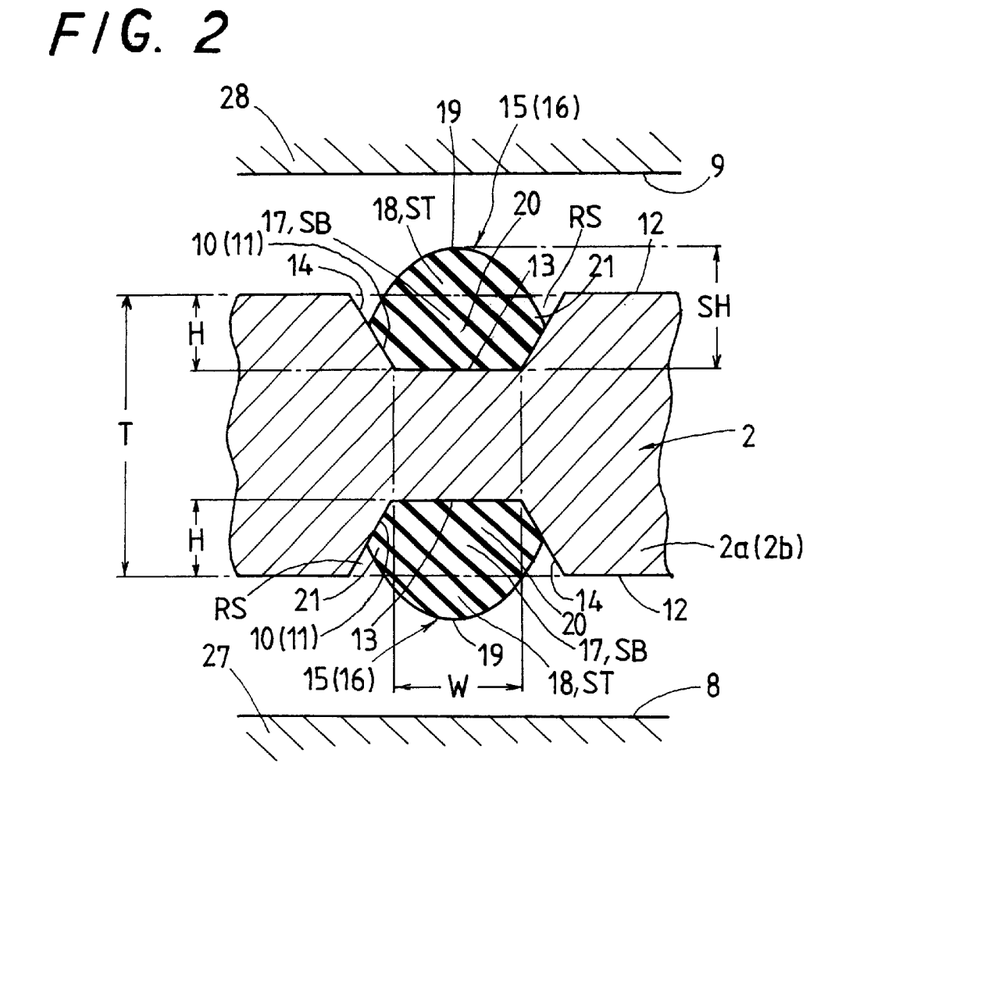
FIG. 2 is a fragmentary sectional view of the metallic gasket of FIG. 1 to explain how an elastic sealing member, when being free of squeezing may be arranged in a recess in any metallic sheet in accordance with the teachings of the present invention.

Referring first to FIGS. 1 and 2 there is shown a metallic gasket 1 made as a cylinder-head gasket that is adapted to be squeezed between mating surfaces 8, 9 of a cylinder block 27 and a cylinder head 28 of an engine, which are illustrated prior to joining together. The metallic gasket 1 is made of a flat metallic sheet 2 including therein an inside area 2a surrounding around a combustion hole 3 formed in alignment with any associated cylinder hole in the cylinder block, and an outside area 2b extending around the inside area 2a and made therein with a series of water holes 4 positioned at regular intervals around the combustion hole 3. The water holes 4 are to allow cooling water to flow through the cylinder block and the cylinder head.

With the inside area 2a, there is provided a combustion sealing means 5 encircling around the combustion hole 3 to keep high-temperature, high-pressure combustion gases against leaking out of a combustion chamber in the cylinder block 27. Any one of beads, folded constructions, hollow bulges and grommets may provide the combustion sealing means 5. Although the combustion sealing means 5 is indicated for the convenience of illustration by a dash-and-dot line in FIG. 1, it will be appreciated that it has a preselected radial width. The metallic gasket 1, when squeezed by tightening a head bolt, develops a high sealing stress against the mating surfaces 8, 9 of the cylinder block 27 and the cylinder head 28 around the combustion hole 3, thus preventing the combustion gases from leakage out of the combustion hole 3.

The inside area 2a is also made with a groove or recess 10 extending along a series of the water hole 4, as indicated by dotted lines, in which is accommodated an elastic sealing member 15. Moreover, the outside area 2b is made therein with an oil hole 7 for allowing lubricating oil to flow through there and a bolt hole 6 in which the head bolt fits to squeeze the metallic gasket 1 between the mating surfaces 8, 9 of the cylinder block 27 and the cylinder head 28. The outside area 2b is also made with another groove or recess 11 extending along the water hole 4, as indicated by dotted lines, in which is accommodated an elastic sealing member 16. In FIG. 1, it is to be understood that any distance across the paired dotted lines represents a width of the recesses 10(11), respectively.

In FIG. 2 there are illustrated in detail the recess 10(11) formed in the metallic sheet 2 and the elastic sealing member 15(16) contained in the recess 10(11). The recesses 10(11) are each sunk in opposition to each other below the opposite sides 12 of the metallic sheet 2 into a depth less than a half of a sheet thickness T. Each bottom surface 13 of the recess 10(11) is made in a flat surface of a width W, while widthwise opposing side surfaces 14 extending from the bottom surface 13 to any major side 12 are somewhat inclined away from each other to form an upward flaring configuration in cross section of the recess 10(11). As an alternative, the widthwise opposing side surfaces 14 of the recess 10(11) may be arranged upright other than the inclined attitude shown in FIG. 2. Besides, the recess 10(11) will be formed by any suitable way of pressing, etching, cutting, and so on.

The elastic sealing member 15, 16 are each formed in a configuration having a gently bowed top in upright cross-section. The elastic sealing members 15, 16 are each composed of a bottom 17 fit snugly in the recess 10(11), and a top 18 integral with the bottom 17 and raised above the side surface 12 of the metallic sheet 2. Thus, the peak 19 of the top 18 extends always above the side surface 12 of the metallic sheet 2. An overall height SH of the elastic sealing member 15(16) is greater than a depth H of the recess 10(11). With the sealing member 15(16), a major portion 20 of the bottom 17 is enough in amount to cover the overall width W of the bottom surface 13, while the bowed top 18 reaches the inclined sides 14 at widthwise far hems 21 thereof.

It is to be noted that an overall cross section (ST+SB) of the sealing member 15(16), which is a summation of a cross section SB of the bottom 17 and a cross section ST of the top 18, is set either equal to a cross section RS of the recess 10(11) or less than the cross section RS of the recess 10(11), that is, is limited to a value not more than the cross section RS of the recess 10(11). The overall cross section (ST SB) of the sealing member 15(16) is made less than the cross section RS of the recess 10(11) by about 25%, preferably about 20%. More minute modification in the cross section will be properly selected depending on the value of elasticity, the desired sealing stress, and so on. A height (SH–H) of the top 18, or a height above the side surface 12 of the metallic sheet 2 is defined within a range of from 0.1 to 1.0 mm. It is most preferable, if possible, to adjust the height of the top 18 to from 0.1 to 0.5 mm, thus making the top 18 roughly equal in height to any corrugated bead ever raised above the metallic sheet 2. As an alternative, the top 19 may be changed in height along a periphery of the combustion hole 3 above the side surface 12 of the metallic sheet 2 as the need arises for the sake of regulating precisely the sealing stress around the combustion hole on the metallic gasket 1. Even if it were very tough to modify only the peak 19 in the height, it would be allowed to take alternative measures to vary the overall height of the elastic sealing member 15(16). The alternative stated just above is especially beneficial to the water hole 4 arranged around the combustion holes that are formed closer to each other. It is also preferable to set an upper limit for a level on the inclined sides 14 where the elastic sealing member 15(16) comes in abutment with the inclined sides 14 at the widthwise far hems 21 of the bowed top 19, or an upper limit for a height occupied with the bottom 20 of the elastic sealing member 15(16). Preferably, the upper limit recited above will be set about two-thirds the depth H of the recess 10(11).

The elastic sealing member 15(16) may be made of any material having elasticity and sealing function such as resins, rubbers, adhesive polymers, and so on. Whenever any foamed material is adopted, it is not prudent to use material that is too soft or supple because of containing therein much pores or cells, but it is recommended to select material that has a high elasticity near rubbers and resins. In this case the cells are sufficiently small to be considered almost negligible for calculation of the cross section. Adhesive of the elastic sealing member 15(16) in the recess 10(11) can be accomplished by any suitable way such as printing, adhesion and coating, with using any available applicator such as ink-jets or the like. The metallic sheet 2 may be made of any one of steel, stainless steel, aluminum, aluminum alloy, titanium-aluminum alloy, and so on. Especially, the preferred steel is a nonmagnetic stainless steel of high Mn–low Ni—N, which is tough to form martensite during the cold-working, with even high in strength and in heat resisting property. The metallic sheet 2 may be covered with any one of micro-sealing coating material and soft sealing material, either party of overall.

Where the elastic sealing member 15(16) is provided by coating of sealing substance, the resulting sealing member may be free of the high-precision control in the direction along the depth of the recess 10(11) and, therefore the utilization of coating manner would make formation of the elastic sealing member much easier. The top 18 of the elastic sealing member 15 (16), as neither extending excessively above the recess nor too less in the recess in service under tightening load, will be well held up on the bottom 17 occupying the cross section SB larger than the top 18, thereby playing a critical role in sealing function. In addition, although the elastic sealing member 15(16) is subject to deformation when squeezed, there is no flowage of sealant so that the elastic sealing member 15(16) as a whole may continue keeping the elastic characteristic thereof. Both the recess 10(11) and the elastic sealing member 15(16) have not to be in absolutely symmetry up and down with respect to the midway plane of the metallic sheet 2. The bolt holes 6 and oil holes 7 may be also each encircled with the same recess as the recess 10(11) stated earlier, in which is installed the same elastic sealing member as the elastic sealing member 15(16) fit in the recess 10 (11), but only any half bead formed in the outside area 2b may be sufficient instead of the recess. The construction shown in FIG. 2 has no bead on the metallic sheet and is adapted to tighten the bolts in sequence to the specified torque.

In the conventional metallic gasket of the type stated earlier, the elastic sealing member 15(16) is usually installed in the recess 10(11), with the widthwise far hems 21 of the elastic sealing member 10(11) coming into engagement with only the bottom surface 21 of the recess 10(11) so that the hems 21 are spaced apart from their confronting inclined side surfaces 14 to leave large clearances open between them. The prior elastic sealing members 15(16) need a troublesome coating work to finish precisely them. Moreover, the conventional elastic sealing member 15(16) constructed as stated just above is liable to be strained to thereby cause any flow of sealing substance when squeezed. With the metallic gasket 1 of the present invention, in contrast, the sealing area around the water hole 4 does not need to be formed with precision, but may be simply formed by only coating of sealing substance. The elastic sealing member 15(16) installed in the metallic gasket 1 of the present invention may be free from an occurrence of flowage of the sealant even under the operating condition that might cause any shrinkage and/or expansion in the clearance between the mating surfaces, which are squeezed together by a tightening force. This helps ensure the properly tight and enduring sealing condition. Thus, the present elastic sealing member 15(16) may serve well within the elastic characteristic range so that there is no occurrence of undesirable deformation in the elastic sealing member 15(16).

Referring next to FIG. 3 and FIGS. 4 to 6, there are shown alternatives of the present invention. Most of the components including a recess 22 and an elastic sealing member 23 are the same in their construction and functions as previously described. To that extent, the components have been given the same reference characters as indicated in FIG. 2, so that the previous description will be applicable.

Figure 3:
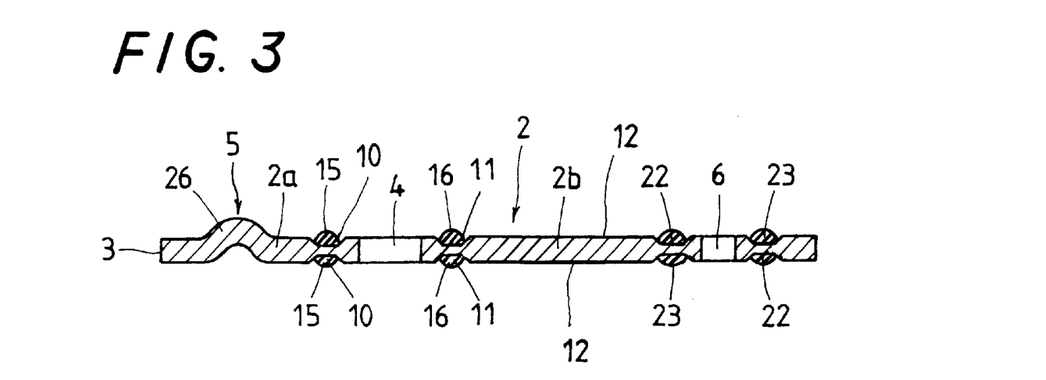
FIG. 3 is a fragmentary sectional view of the metallic gasket of FIG. 1 taken on a plane along the line I—I of that figure.

According to the embodiment shown in FIG. 3, the inside area 2a of the metallic gasket 1 is provided therein a corrugated bead 26 for the combustion sealing means 5 surrounding around the combustion hole 3. The bead 26 is a full bead raised above any one major side 12 of the metallic sheet 2. The bolt hole 6 in the outside area 2b is encircled with annular recesses 22 similar in cross section to the recess 10(11), which are made on the opposite sides 12 of the outside area 2b, one to each side. Elastic sealing members 23 like the elastic sealing member 15(16) in cross section are applied to the annular recesses 22, one to each recess, to play a critical role in sealing function around the bolt hole 6.

Figure 4:
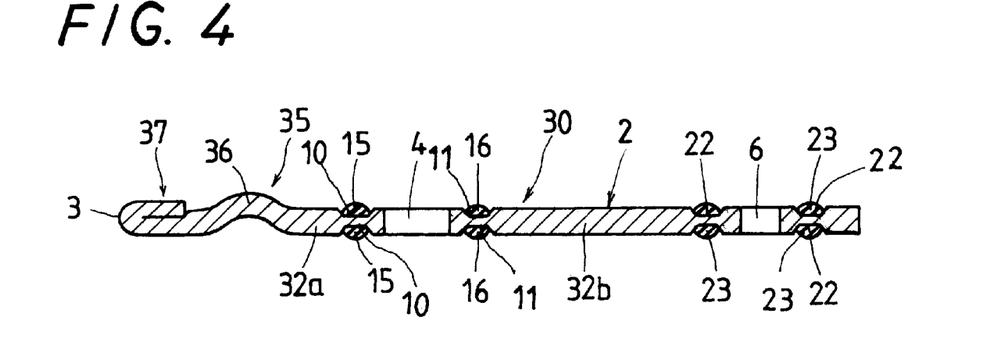
FIG. 4 is a fragmentary sectional view of another embodiment of the metallic gasket according to the present invention.

In an embodiment shown in FIG. 4, a combustion sealing means 35 formed in an inside area 32a of a metallic gasket 30 in a manner surrounding around the combustion hole 2 is composed of a corrugated bead 36 and a folded construction 37 in which a circumferential edge around the combustion hole 3 is folded back radially outwardly inside the bead 36 on the side above which the bead 36 is raised. The bead 36 in the embodiment stated now is a full bead raised above any one major side 12 of the metallic sheet 2. A circumferential area to be folded back over the major part of the inside area 32a to form the folded construction 32a, although being made reduced in thickness in comparison with the major part of the inside area 32a, is set at a thickness enough to provide a total thickness of the folded construction 37, which is greater than that of the inside area 32a. Thus, the folded construction 37 may serve as a compression stopper to regulate the sealing stress of the bead 36, with keeping the bead 36 against flattering out.

Figures 5, 6:
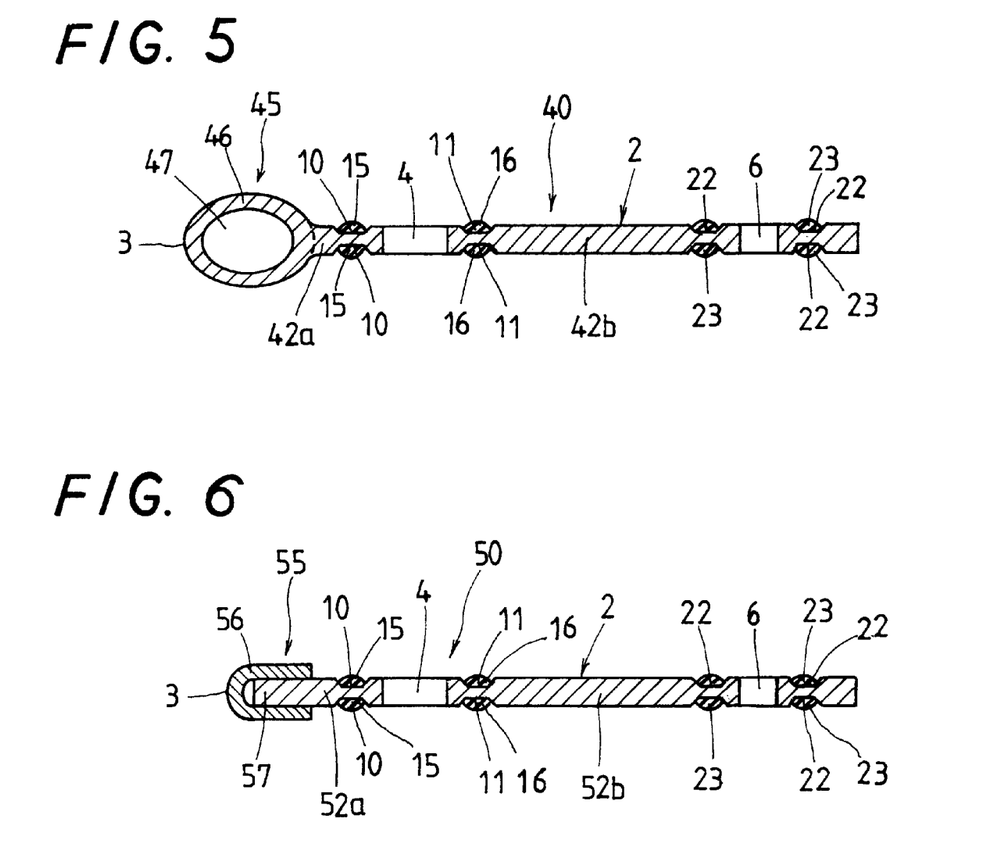
FIG. 5 is a fragmentary sectional view of another embodiment of the metallic gasket according to the present invention.
FIG. 6 is a fragmentary sectional view of a further another embodiment of the metallic gasket according to the present invention.

With a metallic gasket 40 according to another embodiment shown in FIG. 5, a combustion sealing means 45 encircling the combustion hole 3 formed in an inside area 42a is made of a hollowed bulge 46 having an inside cavity 47. The annular hollowed bulge 46 is attached to the inside area 42a by, for example welding and so on. As seen from FIG. 5, the hollowed bulge 46 is designed to have an ellipsoidal configuration in cross section prior to tightening, in which a dimension in a plane including the major sides of the metallic sheet is made larger than a dimension in a plane perpendicular to the major sides. When the metallic gasket 40 is squeezed between the mating surfaces of the cylinder head and he cylinder block, the hollowed bulge 46 undergoes deformation to be collapsed, thus providing around the combustion hole 3 a zone increased in thickness, which develops a high-sealing stress compressed resiliently between the mating surfaces 8, 9, helping enhance the sealing effect.

In a metallic gasket 50 according to a further another embodiment of the present invention, a combustion sealing means 55 encircling the combustion hole 3 formed in an inside area 52a is made of a grommet 56 fit over a circumferential zone 57 of an inside area 52a so as to embrace the zone 57 from the side of the combustion hole 3. The grommet 56 fit over circumferential zone 57 provides around the combustion hole 3 a zone increased in thickness, which develops a high-sealing stress between the mating surfaces 8, 9, helping enhance the sealing effect.

Figure 7:
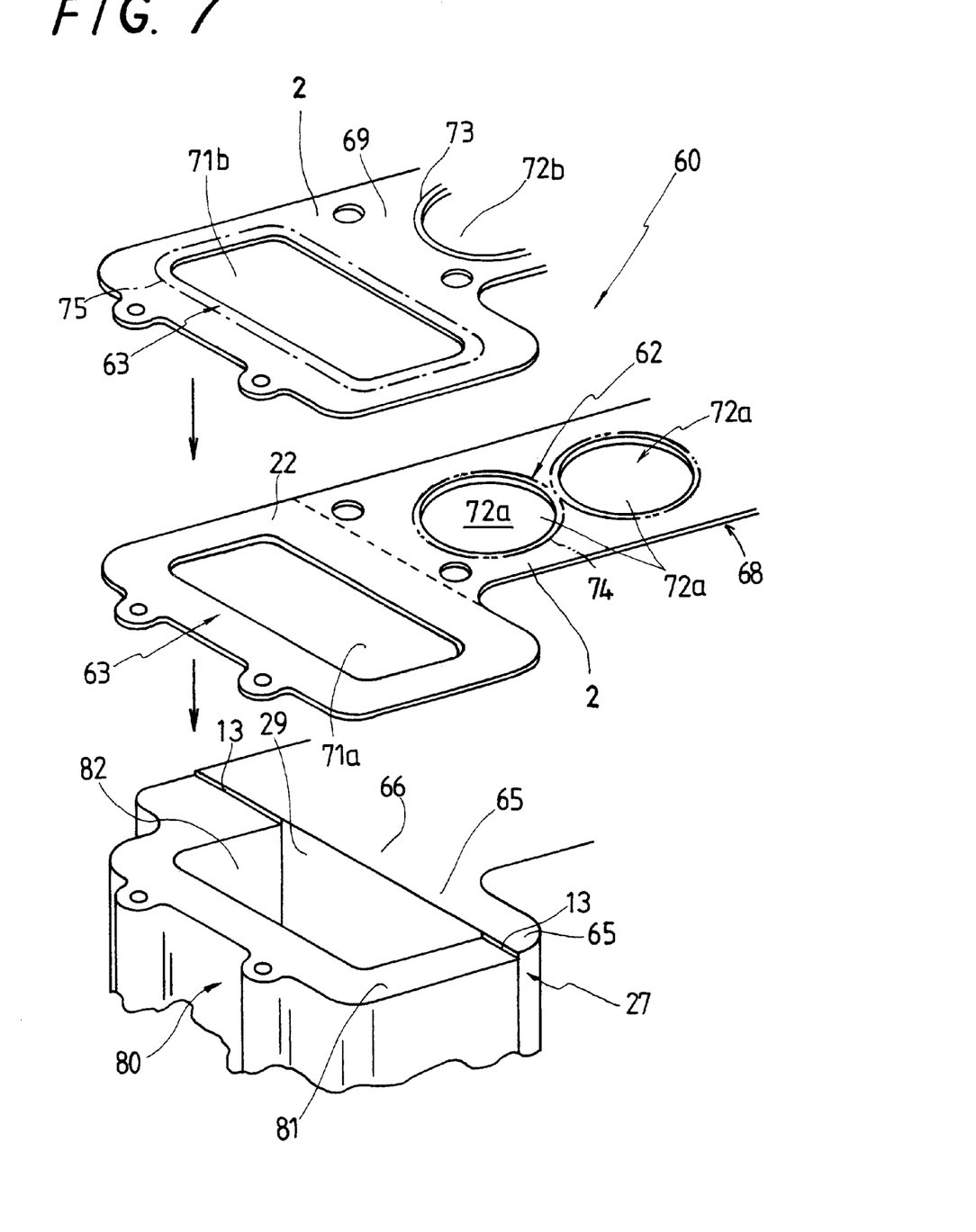
FIG. 7 is a fragmentary perspective view showing an embodiment of a tri-face seal metallic gasket of the present invention to be adapted between a cylinder head and a cylinder block with chain case.
Figure 8:
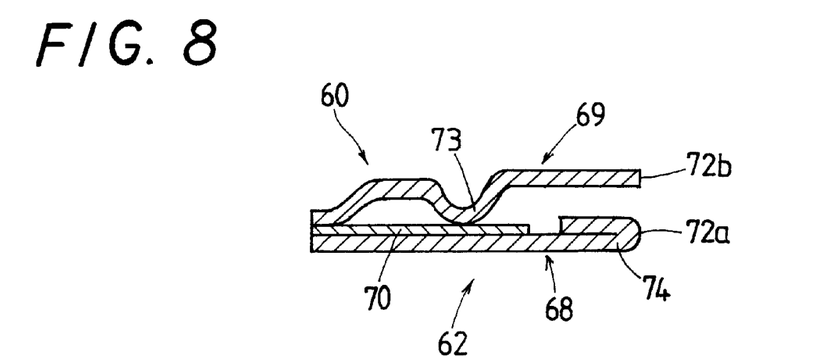
FIG. 8 is a fragmentary sectional view showing a major sealing construction around a combustion hole in the tri-face seal metallic gasket of FIG. 7.
Figure 9:
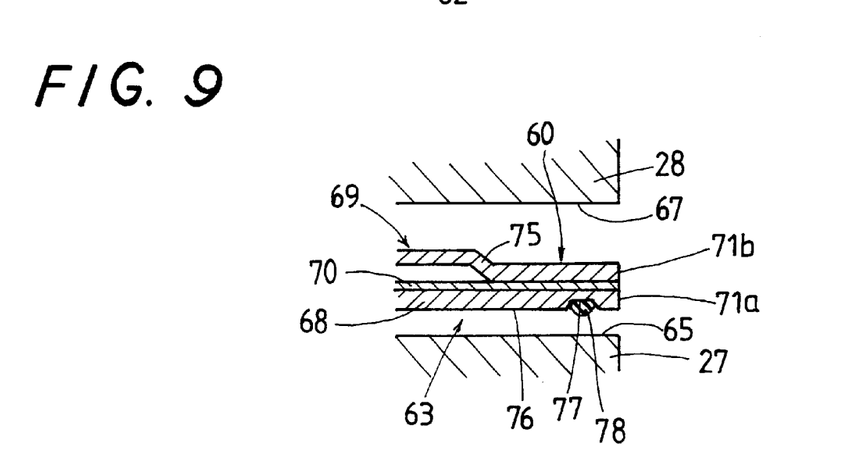
FIG. 9 is a fragmentary sectional view showing a minor sealing construction around a chain case in the tri-face seal metallic gasket of FIG. 7.

Referring finally to FIGS. 7 to 9, there is shown a metallic gasket 60 adapted to a cylinder block integral with a chain case. The metallic gasket 60 is a tri-face seal gasket to seal the joints between a cylinder block 27 with a chain case 80 and a cylinder head, not shown. The chain case 80 is formed separately from the cylinder block 27 and made to a rectangular configuration in horizontal cross-section, with a side confronting with the cylinder block 27 being left open for more reduction in weight. The chain case 80 is attached at two mating edges thereof to a side wall 29 of the cylinder block 27. Inside the chain case 80 closed with the side wall 29 of the cylinder block 29 there is provided a chamber 82 in which a timing chain runs.

The metallic gasket 60 includes a major sealing means 62 and a minor sealing means 63 extending integrally with the major sealing means 62. Interposed between an upper surface 65 of the cylinder block 27 and a lower surface 67 of the cylinder head 28 is the major sealing means 62 to seal various holes such as the combustion hole 3, oil hole, water hole, head-bolt hole, and so on around them. On the other hand, the minor sealing means 63 is squeezed between the lower surface 67 of the cylinder head 28 and an upper edge around an upper opening of the timing-chain chamber 82. The upper edge defining the opened end of the timing-chain chamber 82 includes an upper surface 81 of the chain case 80, and an upper edge 66 merging into the side wall 29 of the cylinder block 27, on which is abutted the chain case 80.

In FIG. 8, the major sealing means 62 in the metallic gasket 60 is shown as being constructed with a lamination of three sheets of elastic metal plate: a metallic stopper plate 68 positioned on the side of the cylinder block 27, a bead plate 69 on the side of the cylinder head 28 and an adjuster plate 70 interposed between the stopper plate 68 and the bead plate 69 to reinforce the gasket and also control the thickness of the gasket. In some instances, the adjuster plate 70 may be eliminated. The bead plate 69 is preferably made of a material better in workability so as to follow readily any distortion of the cylinder head 28, which is liable to be more subject to distortion, compared with the cylinder block 27. All of the bead plate 69, stopper plate 68 and adjuster plate 70 are made of stainless steel. The metallic gasket 60, although not shown in detail, is subject to any heat-treatment and then coated at the opposite sides thereof with nonmetallic substance such as rubbers, for example fluorocarbon rubbers, resins and so on of thermal resistance and oil resistance having a thickness of, for example from about 10μ to about 30μ. Thus, the metallic gasket 60 is kept against metal-to-metal contact with both the cylinder head 28 and the cylinder block 27, thus ensuring corrosion-resistance, long-lasting durability and strength.

Both the stopper plate 68 and the bead plate 69 are made therein with chain-case holes 71a, 71b matched in position to the timing-chain chamber 82 and combustion holes 72a, 72b, respectively. The bead plate 69 has a corrugated bead 73 raised towards the side of the stopper plate 68 at an area slightly spaced apart radially outwardly from the circumferential edge of the combustion hole 72b. Thus, the bead 73 is an annular full bead encircling concentrically around the combustion hole 72b, with being pressed against the stopper plate 68 through the adjuster plate 68. The stopper plate 68 has a folded construction 74 in which a circumferential edge around the combustion hole 72a is folded back on the side of the bead plate 69. The folded construction 74, as formed lest it causes any interference with the corrugated bead 73, serves well to limit a deflection of the bead plate 69 at the circumferential edges of the combustion holes 72a, 72b, thereby keeping the bead 69 against flattering out. The thickness of the folded construction 74 may be controlled in a manner making the stopper plate reduced in thickness, or adjusting an amount of plastic deformation caused during the folding operation. The thickness of the adjuster plate 70 will be controlled by increasing or decreasing the thickness at the area around the combustion holes 72a, 72b relatively to the thickness of the stopper plate 68 at the folded construction 74 and also the height of the corrugated bead 73.

When the metallic gasket 60 is tightened between the mating surfaces 65, 67 of the cylinder block 27 and the cylinder head 28, the corrugated bead 73 on the bead plate 69 comes compressively into contact with the mating surfaces 65, 67 around the combustion holes 72a, 72b to form an annular sealing joints where the compressive sealing stress applied against the mating surfaces 65, 67 rises by an increment in thickness of the folded construction 74 on the stopper plate 68. The annular dual-sealing arrangement constructed as stated earlier succeeds to keep the high-temperature, high-pressure combustion gases against leakage out of the combustion holes 72a, 72b through between the mating surfaces. Increase of the annular sealing area and compensation for any small irregularities in the mating surfaces, or a combination of them are effective to reduce the amount of deflection that might occur in the cylinder head 28 due to the repeated combustion and expansion phases of combustion cycle in an internal combustion engine. As the tightening force in the metallic gasket rests on both the corrugated bead 73 and the folded construction 74, the sealing stress occurring in the bead 73 when tightened will be made reduced, so that the bead 73 is effectively kept against over-compression that might otherwise result in flattering out and crack in the bead 73.

The minor sealing means 63 is constructed with an extension of the lamination of three metallic sheets for the major sealing means 62 recited earlier: the stopper plate 68, the bead plate 69 and the adjuster plate 70. As shown in FIG. 9, the lamination of the stopper plate 68, bead plate 69 and adjuster plate 70 is extended to cover the upper opening of the chain-case chamber 82 and punched to form an aperture 71a, 71b that match substantially in size the upper opening of the chain-case chamber 82. The bead plate 69 is made with a half bead 75 extending along the periphery of the aperture 71b, while the stopper plate 68 is made with a recess 77 on its surface confronting the upper surface 65 of the cylinder block 27. The recess 77 is arranged so as to surround around the aperture 71a and applied with an elastic sealing member 78, similar to the elastic sealing members 15, 23 in FIGS. 1 to 6, by for example coating process and so on. The elastic sealing member 78 is to enhance the sealing effect around the aperture 71a, 71b. Turning head bolts through the specified angle carries out tightening of the metallic gasket 60 around the chain-case chamber 82.

Figure 10:
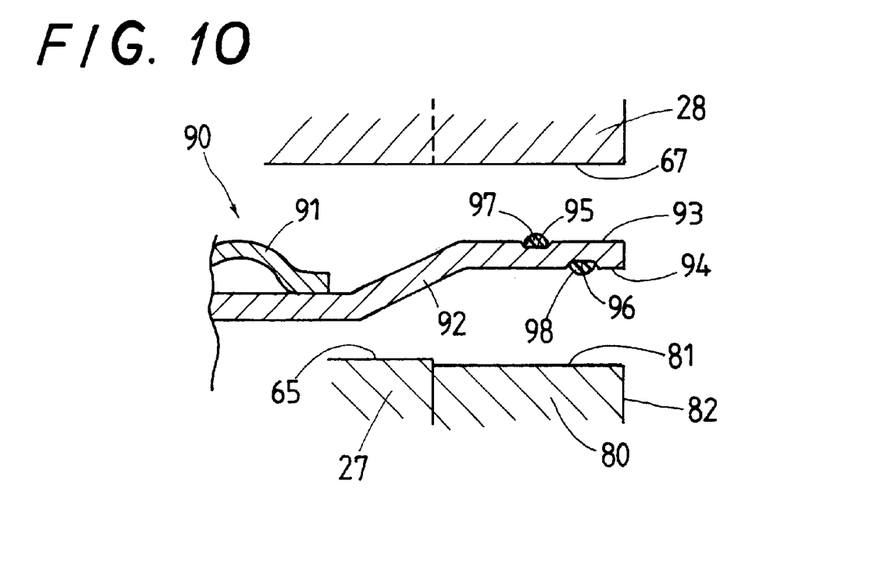
FIG. 10 is a fragmentary sectional view showing another embodiment of the tri-face seal metallic gasket according to the present invention.

A metallic gasket 90 shown in FIG. 10 is, as with the metallic gasket 60 in FIGS. 7 to 9, adapted for installation between the cylinder head 28 and the cylinder block 27 with the chain case 80. That is, the metallic gasket 90 is a tri-face seal gasket to seal the joints between the lower surface 67 of the cylinder head 28 and each of the upper surface 65 of the cylinder block 27 and the upper surface 81 of the chain case 80. The metallic gasket 90 is made to a two-layered construction of a bead plate 91 and a metallic adjuster plate 92. Only the adjuster plate 92 extends above the upper surface 81 of the chain case 80 to be interposed between the lower surface 67 of the cylinder head 28 and the upper surface 81 of the chain case 80. The extension of the adjuster plate 92 is made on the opposite sides 93, 94 thereof with recesses 95, 96, one to each side, which are off-set from each other and applied with elastic sealing members 97, 98 similar to the elastic sealing member 78 in FIG. 9, by for example coating process and so on. The elastic sealing members 97, 98 serve to enhance the sealing effect between the lower surface 67 of the cylinder head 28 and the periphery of the chain-case chamber 82. The relation in configuration between the recesses 95, 96 and the elastic sealing members 97, 98 is similar to the relation of the recess 10(11) and the elastic sealing member 15(16) shown in detail in FIG. 2. To that extent, the previous description will be applicable.

Although the monolayer metallic gasket of the present invention is shown as being made to a metallic cylinder-head gasket adapted to be used between the mating surfaces of the cylinder block and the cylinder head of the engine, it will be appreciated that it may be applicable to a metallic manifold gasket adapted between the mating surfaces of the cylinder head and the exhaust manifold in the engine.

What is claimed is:

1. In a metallic gasket adapted to be disposed between mating surfaces of engine components, which is composed of a metallic sheet made with a hole and a recess surrounding around the hole, and an elastic sealing member installed in the recess:

the improvement characterized in that:
the recess is defined by a bottom surface and side surfaces merging toward the bottom surface with any one major side of the metallic sheet, the bottom surface of the recess made on the metallic sheet extends entirely around the hole without opening to any opposite side of the metallic sheet throughout the bottom surface while the side surfaces extend entirely around the hole so that the recess is made uniform in cross section throughout around the hole:

the elastic sealing member, when free of tightening force, is constructed with a bottom covering entirely the bottom surface of the recess and partially the side surfaces of the recess, a top extending above the major side of the metallic sheet, and slopes extending between the top and the bottom:

the elastic sealing member is smaller than the recess in a cross section perpendicular to the major side of the metallic sheet: and the elastic sealing member, when tightened, experiences an elastic deformation, a maximum amount of which is limited within an area of the recess.

2. An improvement as recited in claim 1, characterized in that the hole is at least any one of a combustion hole, a bolt hole in which a tightening bolt is allowed to fit, a water hole for passing cooling water through there, an oil hole allowing engine oil to flow through there, and an opening for a chain chamber in which an endless chain runs.

3. An improvement as recited in claim 1, characterized in that the metallic sheet is made of any one of a single metallic plate and a lamination of more than one metallic sheet.

4. An improvement as recited in claim 1, characterized in that the bottom of the elastic sealing member has a height of at most about two-thirds a depth of the recess.

5. An improvement as recited in claim 1, characterized in that a peak of the top of the elastic sealing member is set at a height above the major side of the metallic sheet, which is defined within a range of from 0.1 to 1.0 mm.

6. An improvement as recited in claim 1, characterized in that a peak of the top of the elastic sealing member is set at a height above the major side of the metallic sheet, which is defined within a range of from 0.1 to 0.5 mm.

7. An improvement as recited in claim 1, characterized in that the elastic sealing member is 20 to 25% smaller in cross section than that of the recess.

8. An improvement as recited in claim 1, characterized in that the elastic sealing member installed in the recess is made throughout a length thereof less in cross section and also in volume than the recess.

9. An improvement as recited in claim 1, characterized in that the side surfaces defining the recess arranged in a manner either flaring out upwards from the bottom surface of the recess to the major side of the metallic sheet or extending upright from the bottom surface of the recess to the major side of the metallic sheet.

10. An improvement as recited in claim 1, characterized in that the recess is formed on each of opposite major sides of the metallic sheet and the recesses on the opposite major sides are arranged in either aligned or off-set relation with each other across the metallic sheet.

11. An improvement as recited in claim 1, characterized in that the elastic sealing member is made of at least any one selected from resins, rubbers and adhesive polymers.

12. An improvement as recited in claim 1, characterized in that the elastic sealing member is adhered to the recess by using at least any one way of printing, adhesion, coating and ink-jetting.

13. An improvement as recited in claim 1, characterized in that an area increased in thickness compared with the metallic sheet is provided at a zone between the recess and only the combustion hole of various holes.

14. An improvement as recited in claim 13, characterized in that the area increased in thickness is provided by at least any one of a bead formed on the metallic sheet, a folded construction formed by folding back a periphery of the combustion hole, a hollowed bulge containing therein a cavity, and a grommet fit over the periphery of the combustion hole.

* * * * *